(12) United States Patent
Marlett et al.

(10) Patent No.: US 7,587,079 B2
(45) Date of Patent: Sep. 8, 2009

(54) CHECK PRINTING AUDITING SYSTEMS AND METHODS

(75) Inventors: Calvin J. Marlett, LaCrescenta, CA (US); Lily A. Ray, Altadene, CA (US)

(73) Assignee: Xerox Corporation, Norwalk, CT (US)

( * ) Notice: Subject to any disclaimer, the term of this patent is extended or adjusted under 35 U.S.C. 154(b) by 902 days.

(21) Appl. No.: 11/186,647

(22) Filed: Jul. 21, 2005

(65) Prior Publication Data

US 2007/0019855 A1    Jan. 25, 2007

(51) Int. Cl.
*G06K 9/00* (2006.01)
*G06F 21/00* (2006.01)
(52) U.S. Cl. .................... 382/139; 382/175; 705/51
(58) Field of Classification Search ............... 382/100, 382/101, 108, 112, 113, 115, 116, 119, 123, 382/135–140, 154–155, 168, 173–180, 181, 382/182, 188–193, 219, 231, 255, 274, 276, 382/287, 305, 312–321; 705/51, 76; 347/213; 399/20; 714/752; 396/567; 345/629
See application file for complete search history.

(56) References Cited

U.S. PATENT DOCUMENTS

| | | | |
|---|---|---|---|
| 5,470,160 A | 11/1995 | Nowlin | |
| 6,554,504 B2 * | 4/2003 | Cook et al. | 396/567 |
| 6,560,741 B1 * | 5/2003 | Gerety et al. | 714/752 |
| 6,917,375 B2 * | 7/2005 | Akada et al. | 347/213 |
| 6,973,274 B2 * | 12/2005 | Kanamoto et al. | 399/20 |
| 7,006,111 B1 * | 2/2006 | Rothrock | 345/629 |
| 7,080,041 B2 * | 7/2006 | Nagel | 705/51 |
| 7,152,047 B1 * | 12/2006 | Nagel | 705/76 |
| 7,187,795 B2 * | 3/2007 | Jones et al. | 382/135 |
| 7,289,662 B2 * | 10/2007 | Keaton et al. | 382/154 |
| 2003/0025321 A1 | 2/2003 | Lee | |
| 2003/0095193 A1 | 5/2003 | May | |
| 2004/0169663 A1 | 9/2004 | Bernier | |
| 2005/0074159 A1 | 4/2005 | Mitchell et al. | |
| 2005/0089209 A1 | 4/2005 | Stefanuk | |

* cited by examiner

*Primary Examiner*—Seyed Azarian
(74) *Attorney, Agent, or Firm*—Gibb I.P. Law Firm, LLC

(57) ABSTRACT

Embodiments herein print documents comprising magnetic ink characters, capture overlapping partial images of the MICR line of magnetic ink characters, and stitch these partial images together to form a complete image of the MICR line. This allows the embodiments to accumulate the routing number, the account number, the check number, and the amount data in the magnetic ink characters on each document to produce image-based data including accumulated amounts (e.g. ledger). Then, the image-based data including the accumulated amounts can be compared to the anticipated data from the original source of information to verify the accuracy of the printing operations.

24 Claims, 3 Drawing Sheets

CHECK PRINTING AUDITING SYSTEMS AND METHODS

BACKGROUND

Embodiments herein generally relate to the printing and verification of legal and financial documents including checks, negotiable instruments, etc. Many standards have been established for such documents. One such standard is Standard X9.27 entitled "Print Specifications for Magnetic Ink Character Recognition" and referred to as "MICR". This standard is issued by the Accredited Standards Committee on Financial Services under the procedures of the American National Standards Institute and Published by the X9 Secretariat of the American Bankers Association. The specification sets forth the specific type fonts and special toners that must be used in the printing of these documents. Specification X9.13 entitled "American National Specifications for Placement and Location of MICR Printing" imposes stringent requirements for the placement of the MICR characters on checks. This specification delineates the very precise positioning of the MICR print characters relative to the edges of the check form. The specification also prohibits magnetic printing other than MICR characters within the character recognition reading area. The reading area is defined as a "Clear Band (MICR) A Band 0.625 inch high, measured from the aligning edge of the document, parallel to that edge and extending the length of the document. It is reserved for imprinting of MICR characters."

The American National Standard "SPECIFICATIONS FOR PLACEMENT AND LOCATION OF MICR PRINTING" ANSI/ABA X9.13-1990 (Revision of X9.13-1983) incorporated herein by reference, describes the four (4) special characters used to delimit the fields within the MICR line of a check. In addition the specification describes the fields and the number of characters per field. Reading from right to left across the MICR line the AMOUNT FIELD always contains ten digits bracketed by two Amount symbols. The Amount symbol may not be used in any other field. The AMOUNT FIELD is not a required field. Next is the required ON US field of up to 19 characters (spaces are allowed) located between the Routing Field and the Amount Field and usually contains the account number and may also contain a serial number and/or a transaction code. Next is the required ROUTING FIELD that contains 9 characters that are bracketed by two Transit Symbols. The last field is the AUXILIARY ON US Field (used usually for a check serial number).

U.S. Patent Application 2005/0074159, incorporated herein by reference, explains that MICR characters are generally printed on checks by commercial check printers, generally including bank routing, account identification and serial numberings. Banks can append this printed information with the monetary amount field. Historically, most MICR characters were printed by offset printing methods using magnetic ink. Today, laser or ion-deposition methods are increasingly being used, by both commercial printers and financial institutions, for writing MICR encoded information.

The MICR encoded information is usually decoded by detecting one of two different magnetic properties of the magnetizable ink: remanance and permeability. The remanance method involves sensing weak voltage signals while scanning MICR character shapes that have been previously magnetized. The second decoding method, also known as the DC-bias method, involves detecting the changes in permeability presented by the MICR character shapes as these character shapes are scanned by the detector. U.S. Patent Application 2005/0074159 provides one decoding technique that reads MICR signals at two different signal levels: at both high and low gain levels.

SUMMARY

Method embodiments herein print financial documents comprising, for example, monetary amounts. The monetary amounts are printed on the documents using magnetic ink characters. The magnetic characters can be magnetically sensed. In addition, method embodiments herein capture overlapping partial images of the magnetic ink characters and stitch these partial images together to form a complete image of the magnetic ink characters. This allows the method embodiments to accumulate the monetary amounts of the documents as shown in each complete image of the magnetic ink characters on each document to produce image-based accumulated monetary amounts, and to optionally accumulate the monetary amounts of the documents as determined by the magnetically sensing of the magnetic ink characters to produce magnetic-based accumulated monetary amounts. Then, the image-based accumulated monetary amounts can be compared to the anticipated accumulated monetary amounts derived from the basis for the print file. In addition, the image-based accumulated monetary amounts can be compared to the magnetic-based accumulated monetary amounts, and they can be compared to the anticipated accumulated monetary amounts.

The magnetic ink characters can further comprise data regarding routing numbers, account numbers, and check numbers. Thus, data regarding routing numbers, account numbers, and check numbers can also be accumulated. This allows the image-based routing numbers to be compared to anticipated routing numbers, image-based account numbers to be compare to anticipated account numbers, and image-based check numbers to be compared to anticipated check numbers.

The method can sense photograph images of the magnetic ink characters, within the often very small confines of the interior of a printing device. The confines of the interior of the printing device are often so small that less than all the magnetic ink characters on a document can be photographed or optically sensed at a single time. Previous methods avoided using optical sensing capabilities because of the limited space within the interior of the printing device. To address this issue, the method embodiments herein acquire partial images of the magnetic ink characters and stitch the partial magnetic ink character optical images together to produce a complete image of all the magnetic ink characters. This stitched image of all the magnetic ink characters can be recognized by optical character recognition methodologies, placed in electronic form, and accumulated.

Prior to embodiments herein, only the electronic signal from the magnetic ink characters was used to verify that proper anticipated amounts were printed on the documents. The embodiments herein provide an additional optical/image verification vehicle to determine whether the accumulated monetary amount, which was anticipated from the printing instructions and in conjunction with the files sent to the printer for printing, matches the actual amount that was printed on the documents. This optical/image verification process can also be used in conjunction with the magnetic-based electronic sensing verification process.

Apparatus embodiments herein comprise at least one printing engine adapted to print magnetic ink characters comprising monetary amounts on documents, an optional electronic sensor positioned to magnetically sense the magnetic ink characters, and an optical sensor positioned to capture overlapping partial images of the magnetic ink characters. A processor, that is operatively connected to the optical sensor, is adapted to stitch the partial images together to form a complete image of the magnetic ink characters. The processor also accumulates the monetary amounts of the documents as shown in each complete image of the magnetic ink characters on each document to produce image-based accumulated monetary amounts. The processor can further accumulate the monetary amounts of the documents as determined by the electronic sensor of the magnetic ink characters, to produce magnetic-based accumulated monetary amounts. In addition, the apparatus embodiment includes a comparator that is operatively connected to the processor. The comparator is adapted to compare the image-based accumulated monetary amounts to the magnetic-based accumulated monetary amounts, and to the anticipated accumulated monetary amounts from the original data used for printing.

As mentioned above, the magnetic ink characters can comprise data regarding routing numbers, account numbers, and check numbers. Therefore, the processor is further adapted to accumulate data regarding routing numbers, account numbers, and check numbers. Similarly, the comparator compares the image-based routing numbers to anticipated routing numbers, compares the image-based account numbers to anticipated account numbers, and compares image-based check numbers to anticipated check numbers.

One feature is that the optical sensor is positioned within the confines of the interior of the printing device. Again, the confines of the interior of the printing device are often so small that less than all the magnetic ink characters on a document can be photographed or optically sensed at a single time. To address this issue, the apparatus embodiments herein acquire partial images of the magnetic ink characters and stitch the partial magnetic ink character optical images together to produce a complete image of all the magnetic ink characters. As mentioned above, prior to embodiments herein, the electronic signal from the magnetic ink characters was used to verify that proper anticipated amounts were printed on the documents. The method and apparatus/system embodiments herein provide an additional optical/image verification device to determine whether the accumulated monetary amount, which was anticipated from the printing instructions, matches the actual amount that was printed on the documents. This optical/image verification device can also be used in conjunction with the magnetic-based electronic sensing verification devices. These and other features are described in, or are apparent from, the following detailed description.

BRIEF DESCRIPTION OF THE DRAWINGS

Various exemplary embodiments of the systems and methods described in detail below, with reference to the attached drawing figures, in which.

DETAILED DESCRIPTION

The confines of the interior of the printing device are often so small that less than all the magnetic ink characters on a document, e.g. the MICR line at the bottom of a check, can be photographed or optically sensed at a single time. Previous methods avoided using optical sensing capabilities because of the limited space within the interior of the printing device. To address this issue, the embodiments herein acquire partial images of the line of magnetic ink characters and stitch the partial magnetic ink character optical images together to produce a complete image of all the magnetic ink characters. This stitched image of the part of the MICR line can be recognized by optical character recognition methodologies, placed in electronic form, and accumulated. Thus, the embodiments herein provide an additional optical/image verification vehicle to determine whether the accumulated monetary amount, which was anticipated from the printing instructions, matches the actual amount that was printed on the documents.

Figure 1:
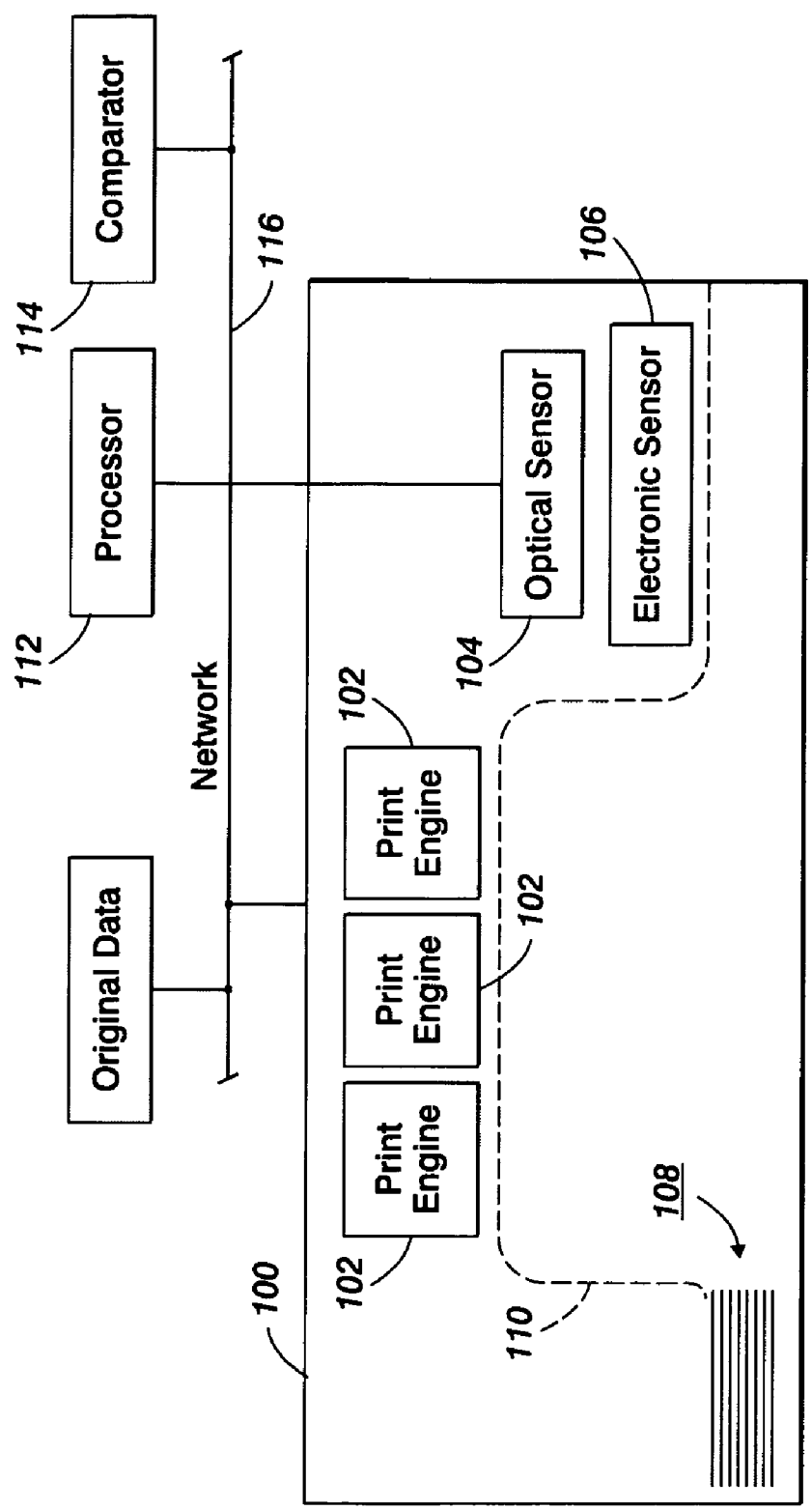
FIG. 1 is a schematic representation of a check printing system embodiment.

As shown in schematic form in FIG. 1, hardware, apparatus, or system embodiments herein use at least one printing engine 102 adapted to print magnetic ink characters comprising monetary amounts on legal and financial documents, such as checks, bonds, negotiable instruments, etc. More specifically, a paper tray or other unit for storing printing media 108 supplies printing media to a conveyor system 110, such as a belt, rollers, paper guides, etc. An optical sensor 104, which can include an illumination system, is positioned adjacent to the conveyor system 110 in a position that can observe the printing media after it has received the printed magnetic ink characters from one or more of the printing engine 102. This allows the optical sensor 104 to capture overlapping partial images of the MICR line. The optical sensor 104 can comprise any form of light sensing, camera, photosensitive device whether now known or developed in the future. Some examples of commonly available optical sensors 104 include charge coupled device (CCD) arrays, photoreceptors, CMOS devices, etc.

An optional electronic sensor 106 is similarly positioned adjacent the conveyor system 110 so as to magnetically sense the printed magnetic ink characters. In addition, a processor 112 and comparator 114 are connected to the optical sensor 104 and the electronic sensor 106 by way of a network or internal wiring 116 (which is only partially shown for clarity). As shown by the dashed lines in FIG. 1, the processor 112 and comparator 114 can be included within and made an integral part of the printing device 100. In addition, the processor 112 and the comparator 114 can be combined as a single device. Alternatively, the processor 112 and the comparator 114 can be distinct devices separate from the printing device 100.

While the features in FIG. 1 are not drawn to scale, the confines of the interior of the printing device 100 are often so small that less than all of the MICR line of magnetic ink characters on a document can be optically sensed at a single time. To address this issue, the embodiments herein acquire partial images of the MICR line and stitch the partial MICR line optical images together to produce a complete image of all the magnetic ink characters.

In one example, printed documents are transported by the conveyor system 110 past the optical sensor 104, which may include its own (or may be connected to a separate) edge detector. The optical sensor 104 detects that the printed document is being transported in front of the optical sensor 104. After an appropriate timing delay, the optical sensor 104 obtains series of overlapping pictures of a line of printed magnetic ink characters. These images are forwarded to the processor 112.

The electronic sensor 106 differs from the optical sensor 104 because the electronic sensor 106 can sequentially sense each individual magnetic ink character as it passes the electronic sensor 106. This allows a series of electronic signals representing the magnetic ink characters be sequentially sent to the processor 112. To the contrary, the optical sensor 104 increases recognition accuracy when larger strings of characters are processed in a single recognition process. More specifically, the processor 112 is adapted to perform optical character recognition (OCR). Many OCR software applications are commercially available from vendors, such as Adobe Systems—Incorporated, San Jose, Calif., USA. While OCR software applications are capable of identifying individual characters in a similar manner as the electronic sensor 106 identifies individual magnetic ink characters, the OCR applications operate more accurately and more efficiently when identifying strings of characters. Therefore, embodiments herein stitch together overlapping images of different portions of the full string of magnetic ink characters printed on a document utilizing a priori knowledge of the construction of the MICR line (see paragraph 0002).

Figure 2:
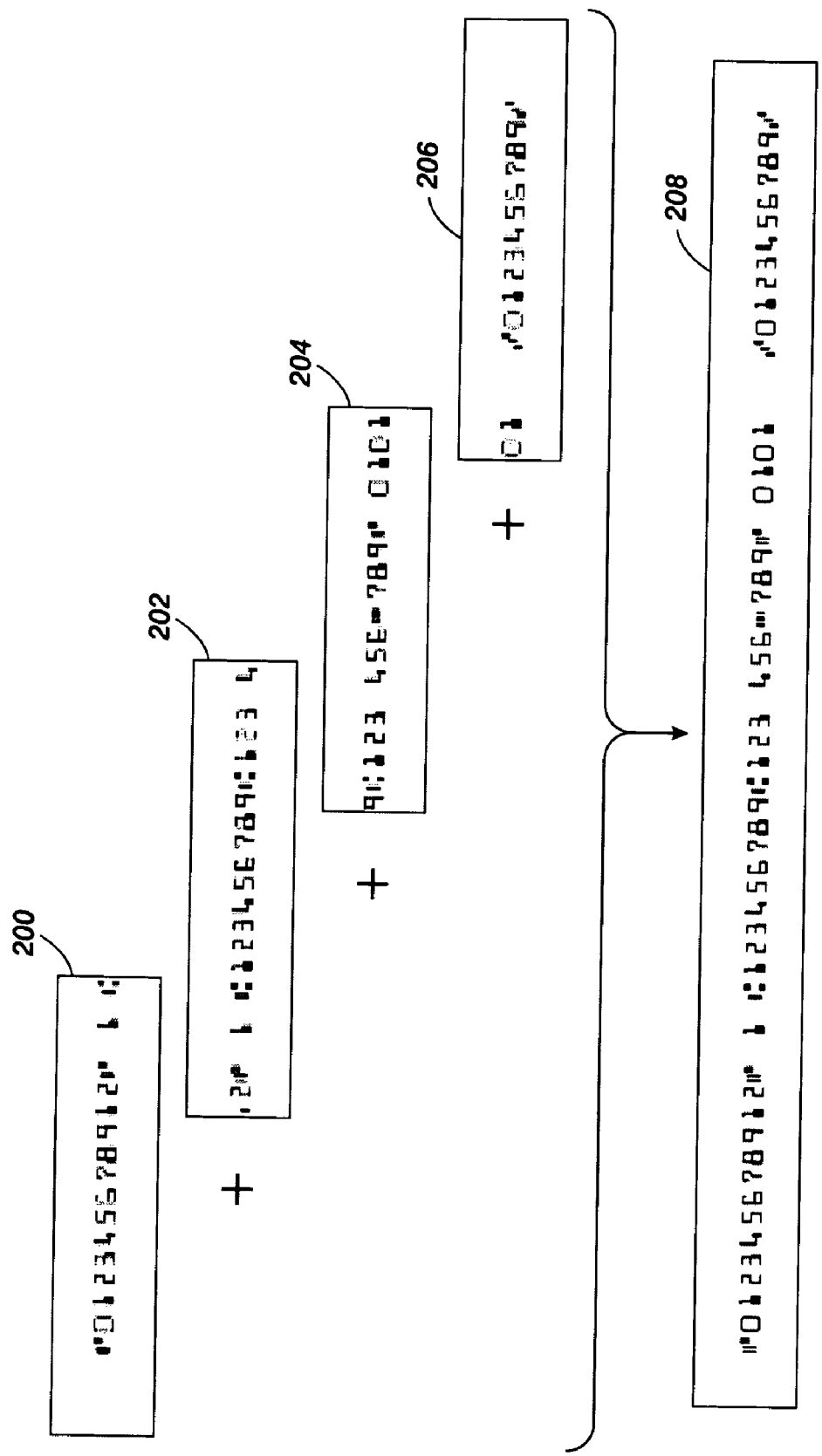
FIG. 2 is a schematic representation of multiple images being stitched together.

An example of this stitching process is shown in FIG. 2. Items 200, 202, 204, and 206 represent a series of images acquired by the optical sensor 104 as a document containing printed magnetic ink characters passes in front of the optical sensor 104. These images are stitched together to create a single image of the entire string of magnetic ink characters as shown by item 208. For example, see U.S. Patent Application Nos. 2004/0169663 and 2003/0095193, incorporated herein by reference, for descriptions of methodologies used to stitch partial images together into completed images.

The OCR application contained within the processor 112 converts the partial images 202, 204, 206, and, 208 to numerical values that are utilized by the processor 112 to perform logical operations to create the stitched image 208. Mathematical and logical operations, such as summing or accumulating, series detection, account detection, etc. can then be performed on the MICR line. Thus, the processor 112 is adapted to stitch the partial images together to form a complete image of the magnetic ink characters and to accumulate the monetary amounts of the documents as shown in each complete image of the magnetic ink characters on each document to produce image-based accumulated monetary amounts. The processor 112 can further accumulate the monetary amounts of the documents as determined by the electronic sensor of the magnetic ink characters, to produce magnetic-based accumulated monetary amounts. In addition, the apparatus embodiment includes a comparator 114 that is operatively connected to the processor 112. The comparator 114 is adapted to compare the image-based accumulated monetary amounts to the magnetic-based accumulated monetary amounts, and to the anticipated accumulated monetary amounts from the original data used to create the print file.

As mentioned above, the magnetic ink characters can comprise data regarding routing numbers, account numbers, and check numbers. Therefore, the processor 112 is further adapted to accumulate data regarding routing numbers, account numbers, and check numbers. Similarly, the comparator 114 compares the image-based routing numbers to anticipate routing numbers, compares the image-based account numbers to anticipated account numbers, and compares image-based check numbers to anticipated check numbers. Such numbers are "anticipated" as the output, based on the input print file data sent to the printing device 100. It is anticipated that the printing device 100 will print the numbers/characters as instructed. If the anticipated characters to not match the optically observed characters, an error is reported to the operator.

One feature of embodiments herein is that the optical sensor is positioned within the confines of the interior of the printing device 100. Again, while FIG. 1 is not drawn to scale, the confines of the interior of the printing device 100 are often so small that less than all the magnetic ink characters on a document can be photographed or optically sensed at a single time. To address this issue, the apparatus embodiments herein acquire partial images of the magnetic ink characters and stitch the partial magnetic ink character optical images together to produce a complete image of all the magnetic ink characters (FIG. 2).

Figure 3:
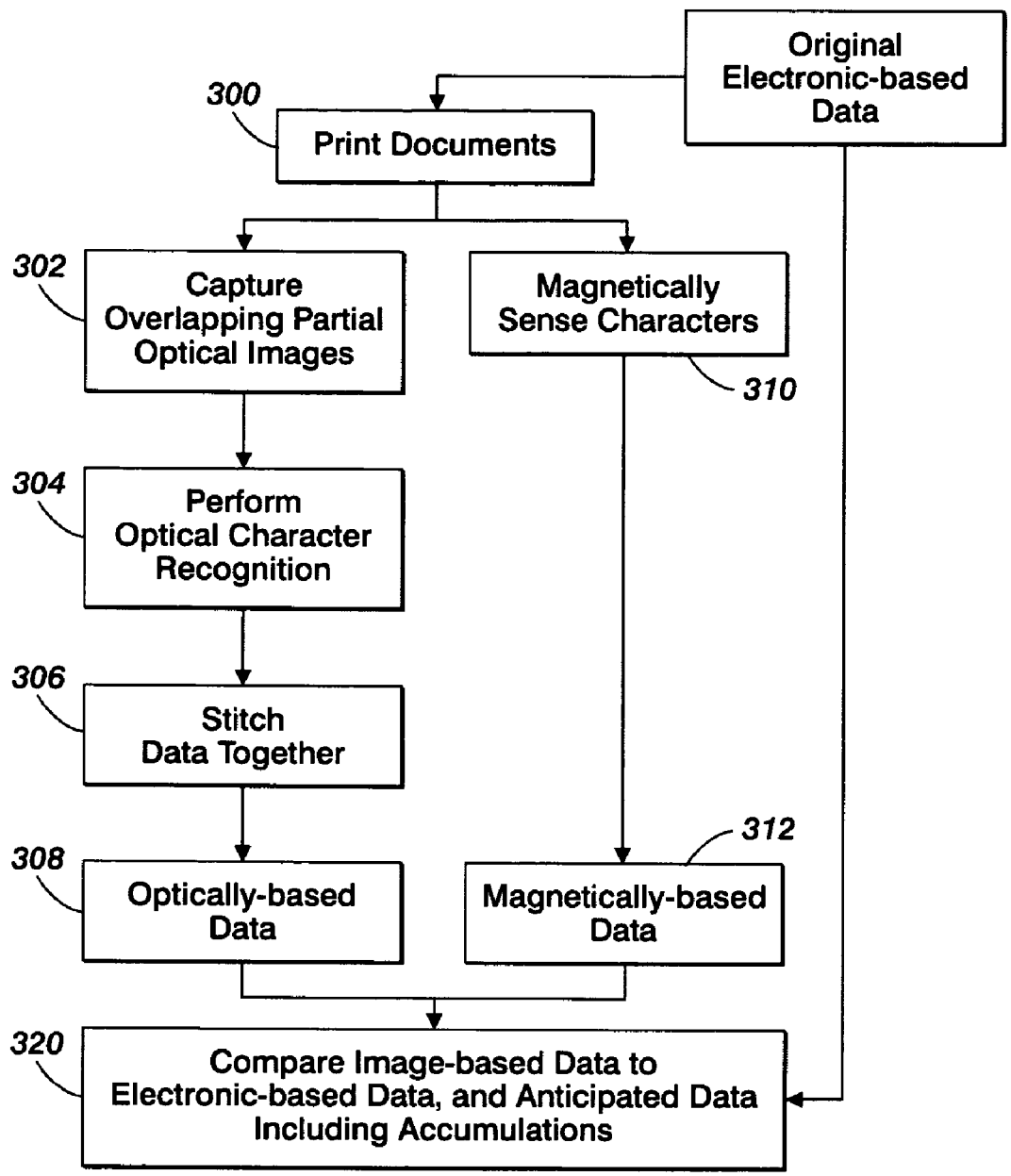
FIG. 3 is a flow diagram illustrating method embodiments herein.

As shown in FIG. 3, method embodiments herein begin with a print of documents comprising monetary amounts 300. The monetary amounts are printed on the documents using magnetic ink characters. In addition, method embodiments herein capture overlapping partial images of the MICR line of magnetic ink characters 302, Optical character recognition is performed in item 304 on the partial images. The MICR line data is stitched together 306 to form a complete image of the MICR line of magnetic ink characters. The optical character recognition can be performed before or after the images are stitched together. This allows the method embodiments to accumulate the monetary amounts of the documents as shown in each complete image of the magnetic ink characters on each document to produce image-based accumulated monetary amounts 308. The magnetic characters can also be magnetically sensed 310. This allows the method to accumulate the monetary amounts of the documents as determined by the magnetically sensing of the magnetic ink characters to produce magnetic-based accumulated monetary amounts 312. Then, the optical-based accumulated monetary amounts can be compared to the magnetic-based accumulated monetary amounts, and compared to anticipated accumulated monetary amounts 320.

The magnetic ink characters can further comprise data regarding routing numbers, account numbers, and check numbers. Thus, data regarding routing numbers, account numbers, and check numbers can also be accumulated. This allows the optical-based routing numbers to be compared to anticipated routing numbers, optical-based account numbers to be compare to anticipated account numbers, and optical-based check numbers to be compared to anticipated check numbers.

The method can optically acquire images of the MICR line of magnetic ink characters, within the often very small confines of the interior of a printing device. The confines of the interior of the printing device are often so small that less than all of the MICR line of magnetic ink characters on a document can be photographed or optically sensed at a single time. To address this issue, the method embodiments herein acquire partial images of the MICR line of magnetic ink characters and stitch the partial magnetic ink character optical images together to produce a complete image of the MICR line data. Prior to embodiments herein, only the electronic signal from the magnetic ink characters was used to verify that proper anticipated amounts were printed on the documents. The embodiments herein provide an additional optical/image verification vehicle to determine whether the accumulated monetary amount, which was anticipated from the printing instructions, matches the actual amount that was printed on the documents. This optical/image verification process can also be used in conjunction with the magnetic-based electronic sensing verification process.

It will be appreciated that the above-disclosed and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the following claims.

What is claimed is:

1. A computer-implemented method that compares image-based monetary amounts to anticipated accumulated amounts on a magnetic ink printer, said method comprising:

printing, by a printer, at least one document comprising magnetic ink characters;

capturing, by an optical sensor, overlapping partial images of said magnetic ink characters;

stitching said partial images together, by a computer, to form a complete image of said magnetic ink characters;

accumulating values of said magnetic ink characters, by said computer, as imaged in said complete image to produce image-based accumulated amounts;

comparing, by said computer, said image-based monetary amounts to anticipated accumulated amounts; and outputting, by said computer, a result of said comparing.

2. The method according to claim 1, wherein said magnetic ink characters further comprise data regarding monetary amounts, routing numbers, account numbers, and check numbers.

3. The method according to claim 2, wherein said accumulating further comprises accumulating data regarding monetary amounts, routing numbers, account numbers, and check numbers.

4. The method according to claim 3, wherein said comparing further comprises:

comparing, by said computer, image-based monetary amounts to anticipated monetary amounts;

comparing, by said computer, image-based routing numbers to anticipated routing numbers;

comparing, by said computer, image-based account numbers to anticipated account numbers; and comparing, by said computer, image-based check numbers to anticipated check numbers.

5. The method according to claim 1, wherein said capturing comprises optically sensing said magnetic ink characters, within an interior of a printing device.

6. The method according to claim 1, wherein said partial images comprise images of less than all said magnetic ink characters on said document.

7. A computer-implemented method that compares image-based monetary amounts to magnetic-based accumulated monetary amounts, and to anticipated accumulated monetary amounts on a magnetic ink printer, said method comprising:

printing, by a printer, at least one document comprising monetary amounts, wherein said monetary amounts are printed on said document using magnetic ink characters;

magnetically sensing, by an electronic sensor, said magnetic ink characters;

capturing overlapping partial images, by an optical sensor, of said magnetic ink characters;

stitching said partial images together, by a computer, to form a complete image of said magnetic ink characters;

accumulating said monetary amounts, by said computer, as imaged in said complete image to produce image-based accumulated monetary amounts;

accumulating said monetary amounts of said documents, by said computer, as determined by said magnetically sensing of said magnetic ink characters to produce magnetic-based accumulated monetary amounts;

comparing, by said computer, said image-based accumulated monetary amounts to said magnetic-based accumulated monetary amounts, and to anticipated accumulated monetary amount; and outputting, by said computer, a result of said comparing.

8. The method according to claim 7, wherein said magnetic ink characters further comprise data regarding routing numbers, account numbers, and check numbers.

9. The method according to claim 8, wherein said accumulating further comprises accumulating data regarding routing numbers, account numbers, and check numbers.

10. The method according to claim 9, wherein said comparing further comprises:

comparing, by said computer, image-based routing numbers to anticipated routing numbers;

comparing, by said computer, image-based account numbers to anticipated account numbers; and comparing, by said computer, image-based check numbers to anticipated check numbers.

11. The method according to claim 7, wherein said capturing comprises optically sensing said magnetic ink characters, within an interior of a printing device.

12. The method according to claim 7, wherein said partial images comprise images of less than all said magnetic ink characters on said document.

13. An apparatus comprising:

at least one printing engine adapted to print magnetic ink characters on at least one document;

an optical sensor positioned to capture overlapping partial images of said magnetic ink characters;

a processor operatively connected to said optical sensor, wherein said processor is adapted to stitch said partial images together to form a complete image of said magnetic ink characters, and to accumulate values of said magnetic ink characters to produce image-based accumulated amounts; and a comparator operatively connected to said processor, wherein said comparator is adapted to compare said image-based accumulated amounts to anticipated accumulated amounts.

14. The apparatus according to claim 13, wherein said magnetic ink characters further comprise data regarding monetary amounts, routing numbers, account numbers, and check numbers.

15. The apparatus according to claim 14, wherein said processor is further adapted to accumulate data regarding monetary amounts, routing numbers, account numbers, and check numbers.

16. The apparatus according to claim 15, wherein said comparator is further adapted to:

compare image-based monetary amounts to anticipated monetary amounts;

compare image-based routing numbers to anticipated routing numbers;

compare image-based account numbers to anticipated account numbers; and compare image-based check numbers to anticipated check numbers.

17. The apparatus according to claim 13, further comprising a printing device, wherein said optical sensor is positioned within an interior of said printing device.

18. The apparatus according to claim 13, wherein said partial images comprise images of less than all said magnetic ink characters on said document.

19. An apparatus comprising:

at least one printing engine adapted to print magnetic ink characters comprising monetary amounts on at least one document;

an electronic sensor positioned to magnetically sense said magnetic ink characters;

an optical sensor positioned to capture overlapping partial images of said magnetic ink characters;

a processor operatively connected to said optical sensor, wherein said processor is adapted to stitch said partial images together to form a complete image of said magnetic ink characters, to accumulate said monetary amounts as shown in said complete image to produce image-based accumulated monetary amounts, and to accumulate said monetary amounts of said documents as determined by said electronic sensor of said magnetic ink characters to produce magnetic-based accumulated monetary amounts; and a comparator operatively connected to said processor, wherein said comparator is adapted to compare said image-based accumulated monetary amounts to said magnetic-based accumulated monetary amounts, and to anticipated accumulated monetary amounts.

20. The apparatus according to claim 19, wherein said magnetic ink characters further comprise data regarding routing numbers, account numbers, and check numbers.

21. The apparatus according to claim 20, wherein said processor is further adapted to accumulate data regarding routing numbers, account numbers, and check numbers.

22. The apparatus according to claim 21, wherein said comparator is further adapted to:
compare image-based routing numbers to anticipated routing numbers;
compare image-based account numbers to anticipated account numbers; and
compare image-based check numbers to anticipated check numbers.

23. The apparatus according to claim 19, further comprising a printing device, wherein said optical sensor is positioned within an interior of said printing device.

24. The apparatus according to claim 19, wherein said partial images comprise images of less than all said magnetic ink characters on said document.

* * * * *